May 24, 1938.  R. H. GELINAS  2,118,504
LOOM TEMPLE
Filed Sept. 27, 1937  2 Sheets-Sheet 1
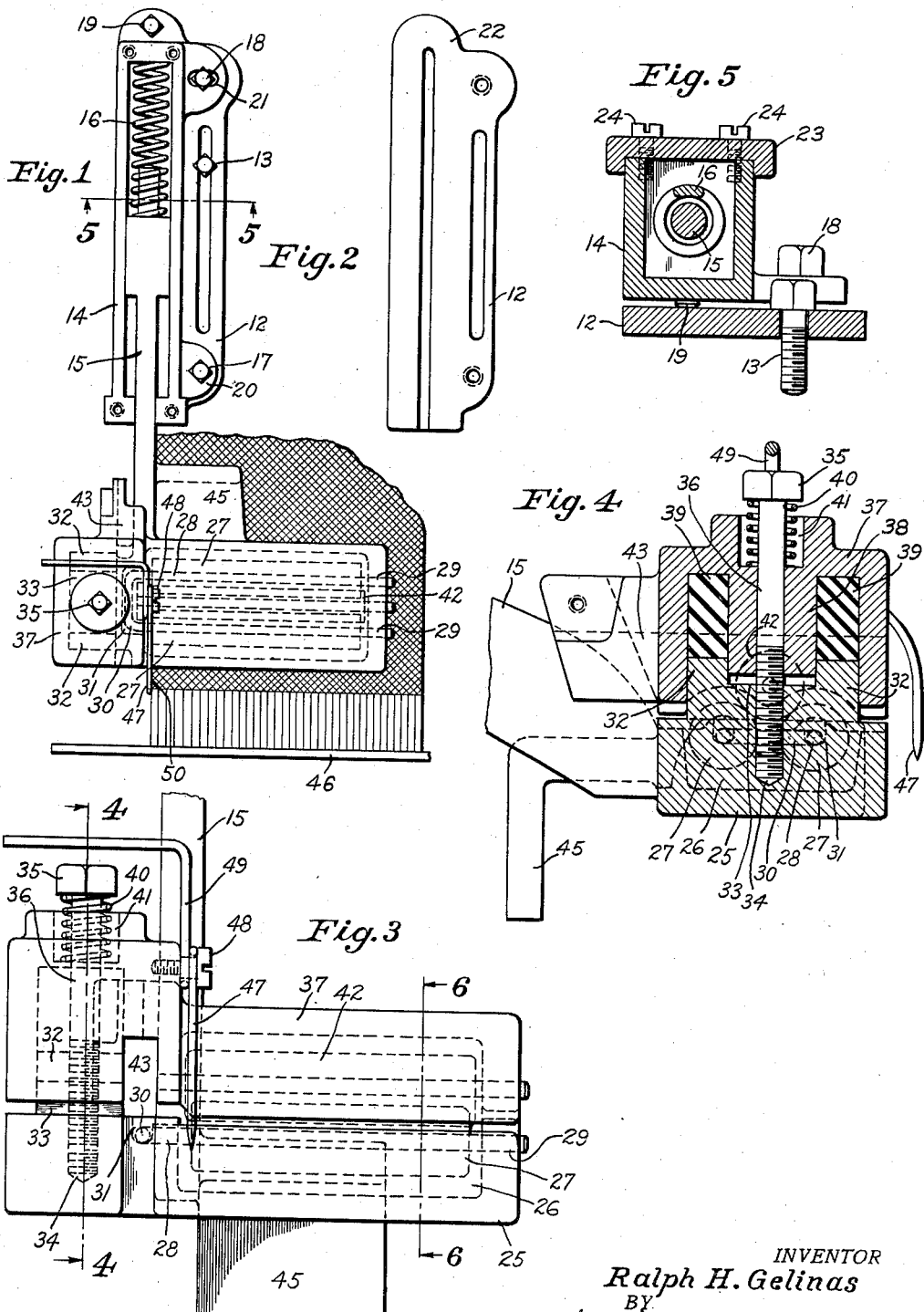
INVENTOR
Ralph H. Gelinas
BY
ATTORNEY May 24, 1938. R. H. GELINAS 2,118,504
LOOM TEMPLE
Filed Sept. 27, 1937 2 Sheets-Sheet 2
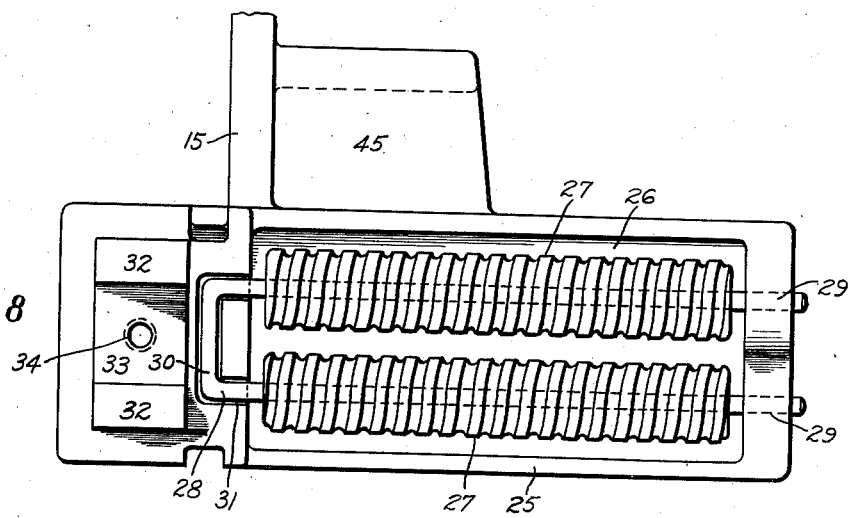
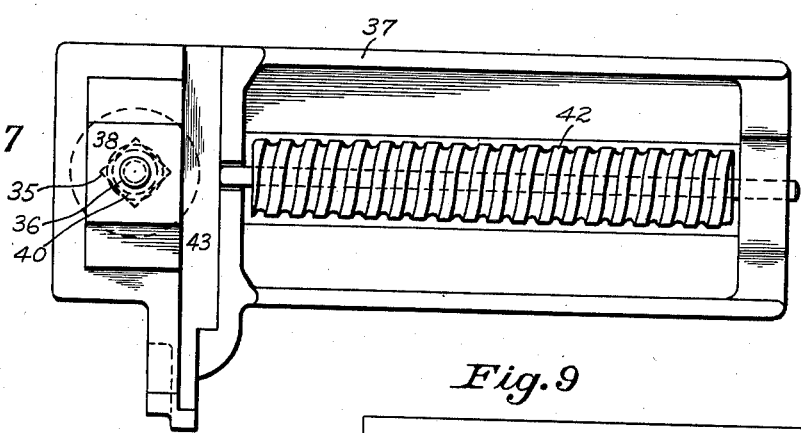
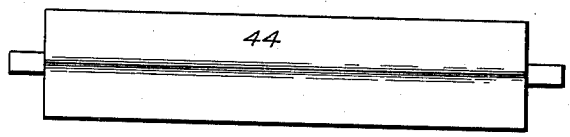
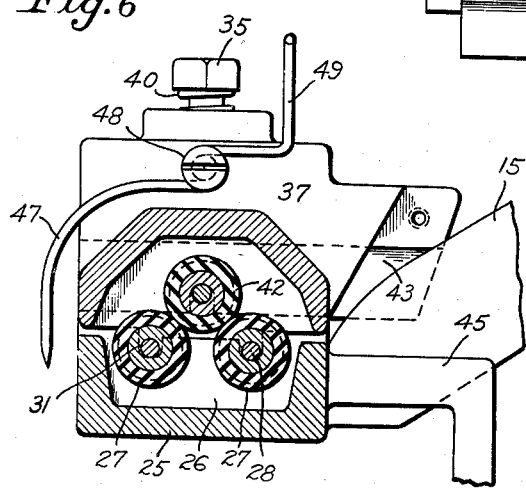
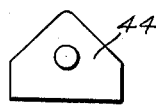
INVENTOR
Ralph H. Gelinas
BY
ATTORNEY Patented May 24, 1938

2,118,504

UNITED STATES PATENT OFFICE 2,118,504

LOOM TEMPLE

Ralph H. Gelinas, South Hadley Falls, Mass.

Application September 27, 1937, Serial No. 165,796

2 Claims. (Cl. 139—292)

My invention relates to loom temples and has for its object to generally improve the construction and efficiency of this class of temples, making them better adapted for use upon different qualities of fabric.

Further objects of the invention include a novel form of needle pick attached to the temple adapted to be used when weaving light warp with heavy filling in a way to prevent the selvage from snagging or lacing. My temple also includes improved adjusting means whereby the tension upon the cloth may be better regulated. The temple is further adapted to the use of comparatively smooth surfaced rollers as well as rollers having slightly roughened surfaces, to better provide the necessary grip upon the cloth.

With these and other objects in view, the invention will be hereinafter more fully described, illustrated, and claimed in connection with the accompanying drawings wherein reference numerals designate like or corresponding parts throughout the several figures of the drawings.

Fig. 1 shows a plan view of my improved form of loom temple having a piece of fabric positioned therein as in the operation of the temple with respect to the fabric.

Fig. 2 shows a detached plan view of a base plate for attachment to the loom, and upon which the temple is adjustably mounted.

Fig. 3 shows a slightly enlarged, front elevation of the temple as seen from the lower side of Fig. 1.

Fig. 4 shows a cross section taken on line 4—4 of Fig. 3 better to show the means of adjusting the rollers of the temple.

Fig. 5 shows an enlarged cross sectional view taken on line 5—5 of Fig. 1 better to illustrate the adjustable supporting means of the temple.

Fig. 6 shows a further vertical cross section through the temple taken on line 6—6 of Fig. 3 looking in the opposite direction from that of Fig. 4.

Fig. 7 shows the cover of the temple in an inverted position with its single roller, also shown in Fig. 6.

Fig. 8 shows a top plan view, on an enlarged scale from that shown in Figs. 1 and 3 of the base portion of the temple including the rollers, and Figs. 9 and 10 show a detached top plan view and an end view respectively of an elongated wedge-like member adapted if desired, to be used as a substitute for the single roller shown in Fig. 7, and under which the fabric is drawn.

My invention is shown and used in connection with that type of temple, wherein a temple arm is associated with an actuating spring to provide in connection with the contact or stroke of the lathe, a sliding or reciprocating movement for the arm.

Referring to the drawings and the numerals of reference marked thereon, 12 indicates a plate adapted to be secured to the loom as by means of a screw 13 and upon which a housing 14 is adjustably mounted. A slide arm 15 is slidably mounted in this housing and is provided with a spring 16 for yieldably supporting the slide arm and temple in their normal forward position. The housing is secured to the plate by means of screws 17, 18, and 19. The first mentioned screw 17 passes through a hole in a lug 20 formed integral with the base of the housing and serves as a pivot upon which adjustable movement is afforded to the housing. The screw 18 passes through a slot 21 in a lug formed integral with the base of the housing and threadably engages a tapped hole in the base plate 12. This obviously provides lateral adjustment with respect to the screw 18 of the housing and likewise enables the housing to be secured when adjusted and set in position with respect to the base plate.

I also provide vertical adjusting means for the rear end portion of the housing with respect to the base plate through the screw 19 which threadably engages a lug on the base of the housing and abuts against the end portion 22 of the base plate 12 so as to permit the outer end of the housing to be raised and lowered with respect to the base plate as is indicated in Fig. 5 and whereby angular adjustment is obtained for the temple with respect to the plate 12. The housing as shown in Fig. 5 includes a cover 23 that is secured to the top portion of the housing by means of screws 24.

The slide arm 15 projects through and reciprocates in the near end of the housing and serves to support the base 25 of the head to which it is secured or made a part. This base, see Figs. 6 and 8, is hollowed out to form a pocket 26 to receive the two rollers 27 that are rotatably mounted upon a U-shaped bearing 28 for the two said rollers. This U-shaped bearing forms two spindles, one for each of the said rollers and has its end portions 29 journaled in the end of the base, and the intermediate bent portion 30 joining the two said spindles seated in a U-shaped recess 31 formed in the inner end portion of the base. This form of supporting means obviously serves for relatively quick and easy removal of the rollers by simply engaging and lifting up the looped inner end portion of the bearing member whereby the same may be removed together with the rollers. This end portion of the base is also provided with centrally raised portions 32 and 33, see Figs. 4 and 7, and a threaded screw hole 34 that serves to receive the adjusting screw 35 which passes freely through the hole 36 in the cap or cover member 37. This raised portion includes two outer bearing portions 32 and an intermediate pocket 33 to receive the depending portion 38 of the cap, two rubber inserts 39, one positioned on each side of this depending portion 38 of the cap, serve to engage the top surface of the raised portions 32 to form a yieldable bearing against which the cap is pressed through the action of the screw 35. In this respect it will be seen that a spiral spring 40 surrounds the upper end of this screw, one end of which abuts against the head of the screw and the other upon the bottom of the pocket 41.

This adjustment is obviously to provide more or less compression of rollers upon the fabric as it is drawn through the temple and to provide a greater or lesser space as between the lower or base portion of the head and cap 37, beforementioned. The outline of this cap is substantially the same in size as that of the base member and like it is recessed to receive a roller 42 which, when the cap is applied to the base, is positioned above the spaced portion of the lower rollers as in the manner indicated in Figs. 3 and 4.

In the cap member I provide a cross slot 43 that provides a run-way for a knife (not shown). The roller 42 mounted in the cap 37, as shown in Figs. 3 and 7, may be lifted out and the wedge 44, shown in Figs. 9 and 10, substituted if desired to be used on different classes of work. This upper roller may be taken out to make this change or to remedy trouble without interfering with the cloth.

The buffer arm 45 projects from the base member of the temple and obviously is designed to receive the blow of the lay 46 of the loom (not shown) which acts against the resistance of the spring 16.

I also provide a needle pick 47 that is pivotally supported to swing on a pivotal screw 48 secured to the raised portion of the cover 37, that is somewhat in the form of a bell crank having a pointed end portion depend down in the path of the selvage edge of the warp 50 in a manner to loop and guide the filling if a heavy filling is used, and thereby prevent the selvage 50 from snagging or lacing. The upwardly extended arm 49 of this pick is disposed in the line of travel of the reed by means of which it is operated.

The present invention as disclosed above possesses several advantages among which is the improved adjusting means for the cover of the head with respect to the base. Another is that the two lower rollers in the base are mounted upon a U-shaped bearing member that can be more readily removed as occasion may require. Also the inclusion of the pick which insures the formation of a proper selvage on special classes of work and furthermore in the means for the vertical and horizontal adjustment of the housing supporting the head.

Having thus described my invention, what I claim and desire to secure by Letters Patent is:

1. A loom temple of the class described, comprising a pod including a base, two rollers mounted therein, a cover mounted thereon and having an enlarged end portion to accommodate means for adjusting the cover with respect to the base, a roller in the cover, the said base member having spaced apart raised guide portions in its said enlarged end portion, the cover member having pockets to receive the said raised portion and an intermediate depending back portion, rubber cushions within the pockets, an adjusting screw connecting the cap and pod for adjustably securing the two members of the pod against the cushions and with respect to each other.

2. A loom temple of the class described, comprising a pod including a base, two rollers mounted therein, a cover mounted thereon and having an enlarged end portion to accommodate means for adjusting the cover with respect to the base, a roller in the cover, the said base member having spaced apart raised guide portions in its said enlarged end portion, the cover member having pockets to receive the said raised portion and an intermediate depending back portion, rubber cushions within the pockets, an adjusting screw connecting the cap and pod for adjustably securing the two members of the pod against the cushions and with respect to each other, the said enlarged end portion of the base including a U-shaped pocket, a removable U-shaped roller bearing, the bent end portion of which is mounted in said U-shaped pocket and the free end in the opposite end of the pod and a roller mounted on each leg of said U-shaped bearing member.

RALPH H. GELINAS.